A. KRIEGER.
Clamping-Pieces for Insertible Saw-Teeth.

No. 218,280.  Patented Aug. 5, 1879.

Witnesses:
J. W. Garner
W. S. O'Hanes

Inventor:
A. Krieger,
per
F. A. Lehmann, Atty.

UNITED STATES PATENT OFFICE.

ANDREW KRIEGER, OF PITTSBURG, PENNSYLVANIA.

IMPROVEMENT IN CLAMPING-PIECES FOR INSERTIBLE SAW-TEETH.

Specification forming part of Letters Patent No. 218,280, dated August 5, 1879; application filed June 19, 1879.

*To all whom it may concern:*

Be it known that I, ANDREW KRIEGER, of Pittsburg, in the county of Allegheny and State of Pennsylvania, have invented certain new and useful Improvements in Clamping-Pieces for Insertible Saw-Teeth; and I do hereby declare the following to be a full, clear, and exact description of the invention, such as will enable others skilled in the art to which it pertains to make and use it, reference being had to the accompanying drawings, which form part of this specification.

My invention relates to an improvement in clamp-pieces for insertible saw-teeth, and has reference to Patent No. 195,699, dated October 2, 1877.

It consists in a new holding or clamping device, by which each tooth is held, and by which the effect of heat, when the saw is in operation, is counteracted.

It also consists in changing the manner of securing the teeth, thereby increasing their strength and rigidity, as will be more fully described hereinafter.

The accompanying drawings represent my invention.

Figure 1:
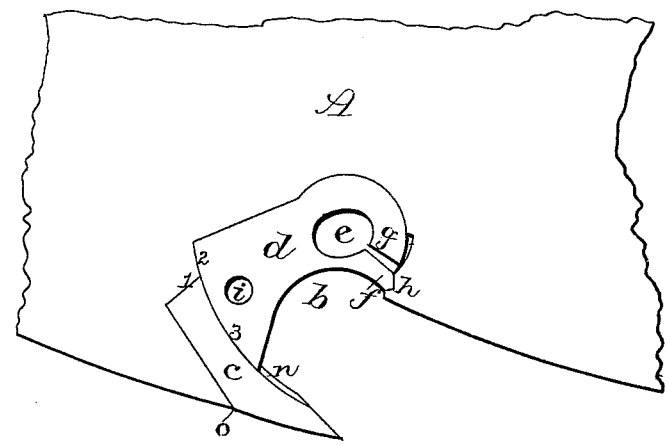
Figure 2:
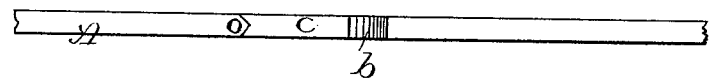
Figure 3:
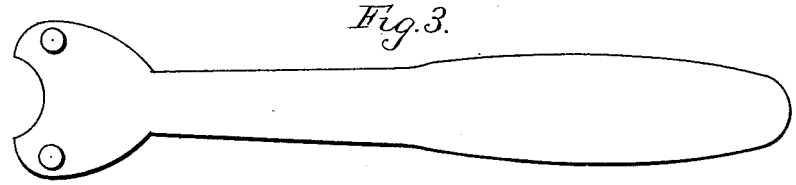

Figure 1 is a side elevation of my tooth and its holding device or clamp. Fig. 2 is an edge view of the same. Fig. 3 is a plan view of the wrench.

The saw-plate A has recesses $b$, for the insertion of teeth $c$; and holding or clamping devices $d$. The side 1 of that part of each recess in which the tooth is inserted turns abruptly at a right angle, and then joins the arc 2, against which the eccentric face of the clamping plate operates, thus forming a square abutment for the tooth, which tooth, being grooved at its corresponding side, is kept from sliding sidewise by a tongue, O, on the edge of the recess.

The clamping-plate $d$ is of the thickness of the saw, has an eccentric face, 3, bearing outwardly against the arc 2 at the under side of the tooth, and also against the saw-plate A, the tooth forming a part of the arc, as shown. The arc formed by the tooth and saw in the recess $b$ is provided with a tongue, $n$, which enters the grooved edge of the eccentric face of the clamping-plate, so that when this plate is made to secure the tooth by being turned it is supported by the saw-plate in rigidly holding the tooth.

In the clamping-plate, near its circular end, is an opening, $e$, which is made to answer two purposes—first, to form two springs, $f$ and $g$, separated by a cut from the opening $e$ outwardly. The former of the two springs, $f$, when the clamping-plate is brought home to secure the tooth, enters the notch $h$ within the recess $b$, and prevents its turning back. The latter, $g$, holds the clamping-plate when by heat the saw-plate expands, and with it the recess $b$, by following their expansion and yielding to contraction. By this means the clamping-plate is so firmly held that it only can be removed after forcibly depressing the spring $f$ by a wrench or other suitable tool. And, secondly, the opening $e$ serves, in connection with the hole $i$, for the insertion of the wrench to turn the clamping-plate.

It has been found that saw-teeth made and inserted in accordance with the patent referred to do not perform as expected, since whenever a knot in the wood is encountered, and frequently without apparent cause, they are knocked out of place; and not only when hard objects are met do they leave their places, but as soon as the saw becomes heated and the recess holding the tooth and clamping device is enlarged it has been found impossible to retain the teeth in their places to perform their work, because no provision is made for the occasion.

It has, therefore, been my object to overcome these objectionable features, and by shortening the teeth, abutting them squarely against the saw-plate, and making the clamping-plate bear against both the tooth and the saw-plate, I secure the tooth rigidly, and prevent its springing or yielding, which causes its being thrown out. The effects of heat I counteract, as hereinbefore stated, by the application of springs, forming a part of the clamping-plate, one of which keeps the plate from returning, and the other adapts it to an increased or diminished area of the recess in which it is held.

I am aware that a saw-tooth clamp having a slit in its outer end, and made to catch in the outer edge of the tooth, so as to force the tooth in and out of position as the clamp is moved back and forth, is old; but I am not aware that any clamp has ever been provided with a spring to catch in the saw-plate, and which can be removed and replaced independently of the tooth; but

What I claim as my own invention, and desire to secure by Letters Patent, is—

1. A clamp for holding a saw-tooth in position, which has a spring, $f$, formed on its inner end, which snaps into a recess, $h$, in the saw-plate, substantially as shown.

2. A clamping-plate for holding a saw-tooth in position, that is provided with a split portion, forming a spring, at the end, which engages with the saw-plate, substantially as specified.

In testimony that I claim the foregoing I have hereunto set my hand this 16th day of June, 1879.

ANDREW KRIEGER.

Witnesses:
CLARENCE BURLEIGH,
T. F. LEHMANN.